Oct. 21, 1952      K. G. ZEUTHEN      2,614,456
APPARATUS FOR ADVANCING FILM STEPWISE
Filed Dec. 13, 1949      3 Sheets-Sheet 1
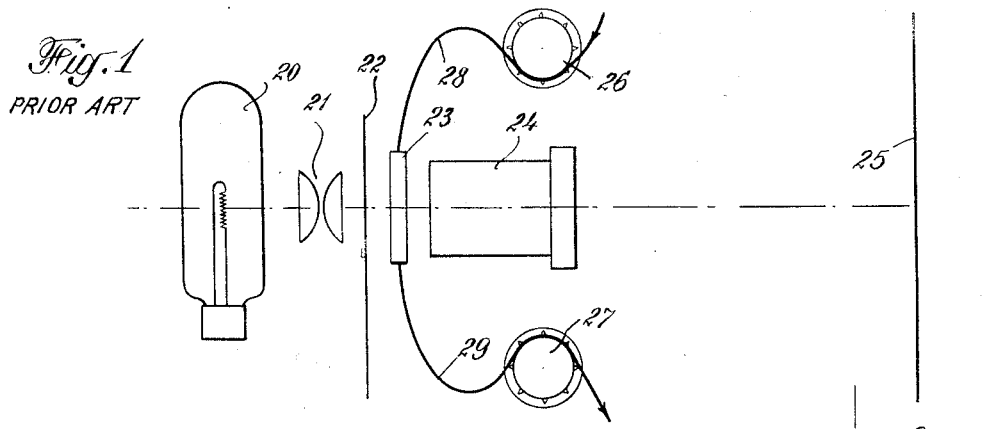
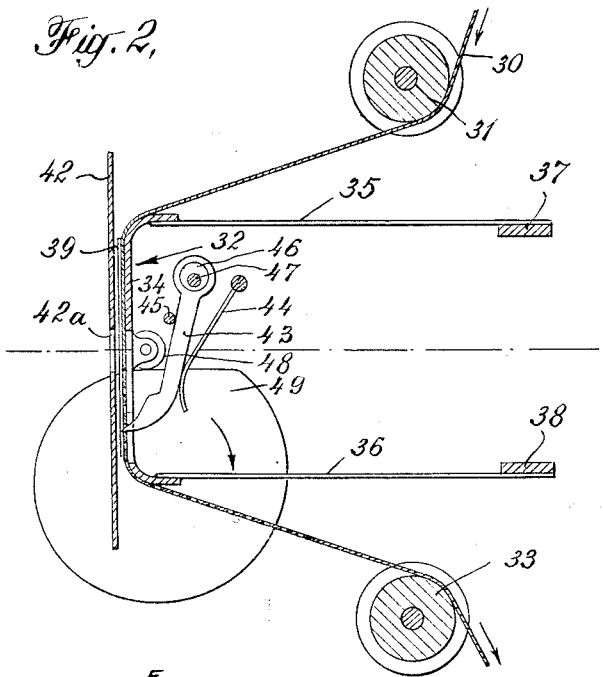
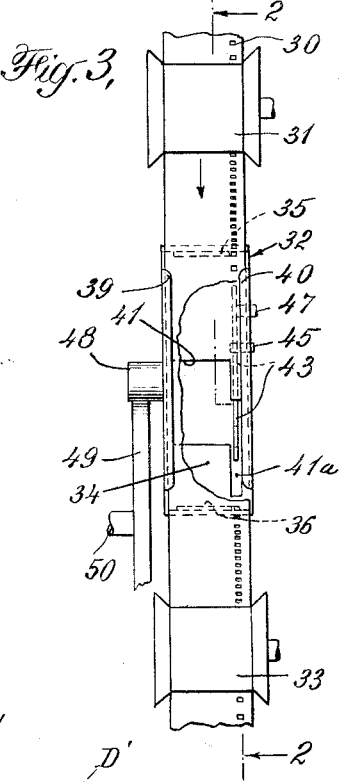
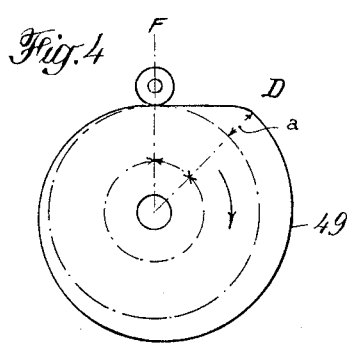
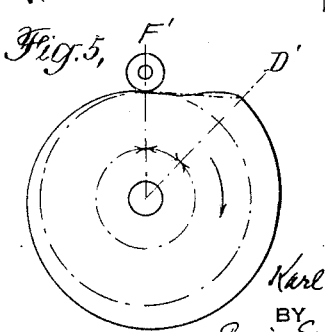
INVENTOR
Karl Gustav Zeuthen
BY
Pennie Edmonds Morton & Barrows
ATTORNEYS Oct. 21, 1952 — K. G. ZEUTHEN — 2,614,456
APPARATUS FOR ADVANCING FILM STEPWISE
Filed Dec. 13, 1949 — 3 Sheets-Sheet 2
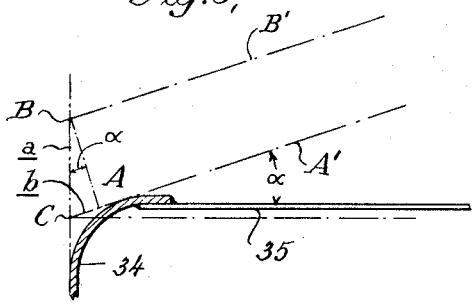
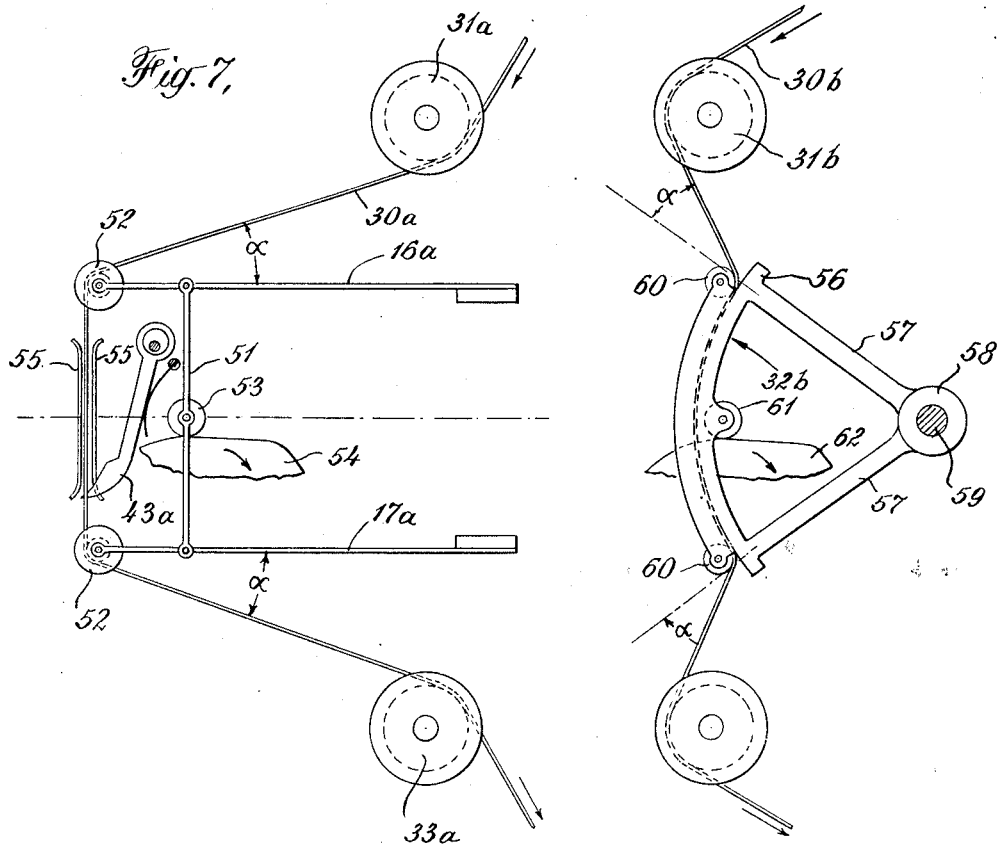
INVENTOR
Karl Gustav Zeuthen
BY
ATTORNEYS Oct. 21, 1952 K. G. ZEUTHEN 2,614,456
APPARATUS FOR ADVANCING FILM STEPWISE
Filed Dec. 13, 1949 3 Sheets-Sheet 3
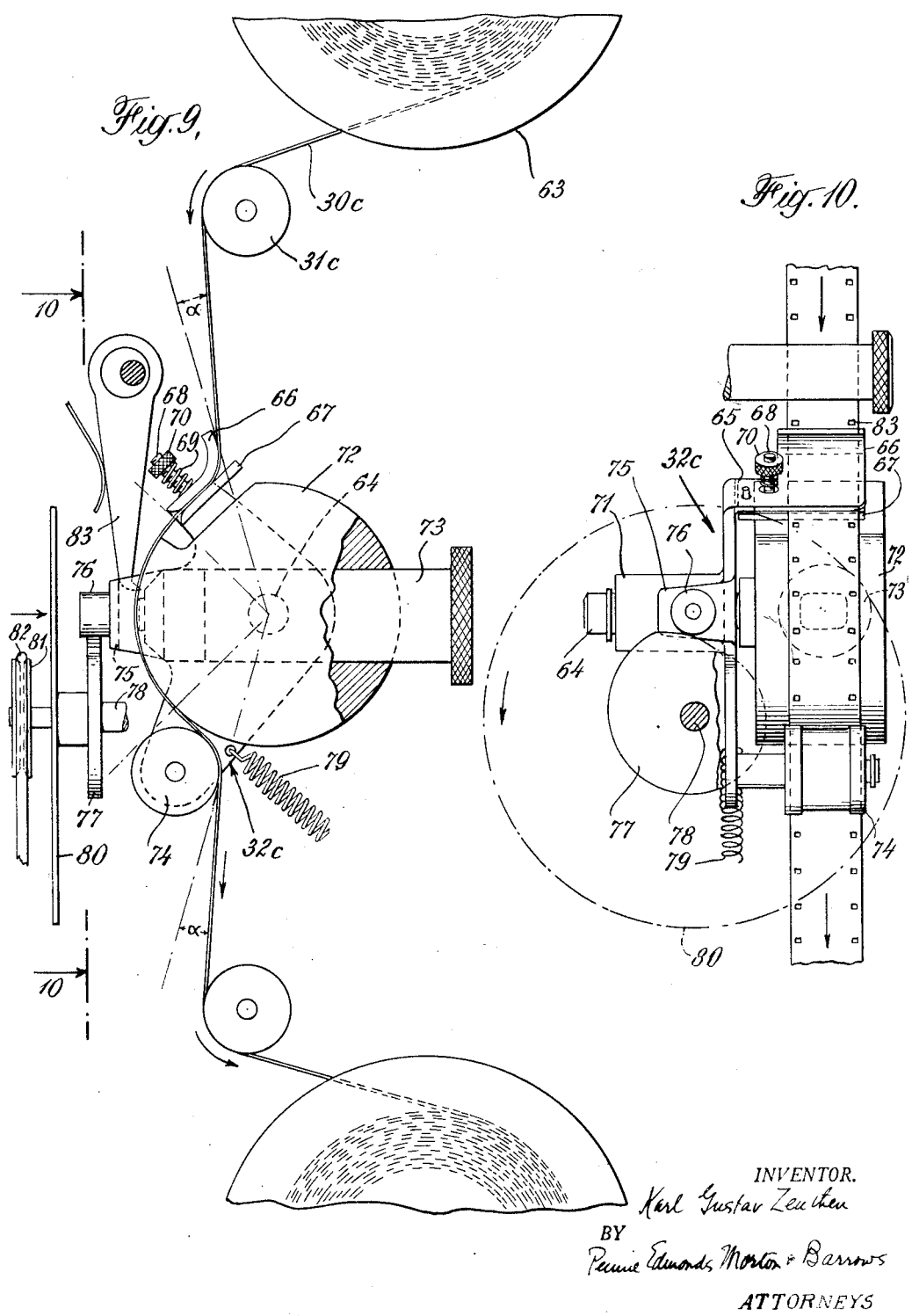
INVENTOR.
Karl Gustav Zeuthen
BY
Pennie Edmonds Morton & Barrows
ATTORNEYS Patented Oct. 21, 1952

2,614,456

UNITED STATES PATENT OFFICE 2,614,456

APPARATUS FOR ADVANCING FILM STEPWISE

Karl Gustav Zeuthen, Gentofte, near Copenhagen, Denmark

Application December 13, 1949, Serial No. 132,728
In Denmark December 14, 1948

7 Claims. (Cl. 88—18)

This invention relates to apparatus for advancing a film stepwise past the gate of a cinematographic projector or camera, and is concerned with a novel apparatus for the purpose, which is superior to those heretofore used, in that it is of simpler construction, imposes less wear on the film, and can be threaded up more easily.

In film feeding apparatus now used, the film is fed from a supply reel to a driven sprocket guide roller, the sprockets of which enter perforations in the film and advance it to the gate, at which an intermittent feed mechanism is located. From the feed mechanism, the film passes to another driven sprocket guide roller, which delivers the film to the take-up reel, and, since the two guide rollers are driven at a uniform rate, it is necessary to form the film into loops at opposite sides of the gate. In such an apparatus, the elements must be made with great precision and, even then, the film is subjected to heavy wear, because of the engagement in its perforations of parts of the feed mechanism and guide rollers. Such wear is increased, when the distance between adjacent perforations decreases with shrinkage of the film. Also the necessity of effecting engagement of the perforations of the film with parts of the apparatus and of forming the film into loops between the guide rollers and feed mechanism makes it difficult to thread the film through such apparatus.

The present invention is directed to a novel apparatus for feeding film intermittently past the gate of a cinematographic projector or camera, which overcomes the objections to prior similar apparatus, above set forth. In the new apparatus, the film is unreeled at a uniform rate, is kept taut at all times, and is advanced stepwise past the gate. The film is fed frictionally by means of a reciprocating holder, which holds a length of the film and reciprocates in a direction generally lengthwise thereof with a feeding movement taking place in $x$ units of time and a slow return movement requiring $(n-1)x$ units of time. During its feeding movement, the holder advances the film by its frictional engagement therewith and, during the return movement of the holder, it slides relatively to the film, which is retained in place by suitable detent means. The film passes over a pair of plain freely rotating guides on its way to the reciprocating holder and the guides are so disposed, that the planes of the film, as it approaches and leaves the holder, make approximately equal angles $a$ with normals to the direction of reciprocation of the holder, which pass through the points where the film first and last engages the holder. When the size of the angle $a$ is such that sin $a$ is approximately equal to $1/n$, the film is unreeled at a uniform rate, as will later be explained.

For a better understanding of the invention, reference may be made to the accompanying drawings, in which Fig. 1 is a diagrammatic view in side elevation showing the operation of a film projector as now ordinarily constructed;

Fig. 2 is a diagrammatic view in side elevation of one form of the feeding apparatus of the present invention on the line 2—2 of Fig. 3;

Fig. 3 is an end elevation of the apparatus shown in Fig. 2 with the fixed gate omitted;

Figs. 4 and 5 are diagrams of alternative driving cams for use in the apparatus shown in Fig. 2;

Fig. 6 is a diagram showing the operation of the new apparatus;

Figs. 7 and 8 are diagrammatic views in side elevation of alternative embodiments of the invention;

Fig. 9 is a view in side elevation, with parts broken away, of another embodiment of the invention; and Fig. 10 is a view in vertical section on the line 10—10 of Fig. 9.

In the type of projector ordinarily used at present and illustrated in Fig. 1, light from a source 20 passes through a condensing lens 21 and a rotating shutter 22 to a film feeding gate, indicated at 23. Light passing through the frame of the film in place in the gate passes through an objective 24 and is projected upon a viewing screen 25. The film is supplied from an upper reel, not shown, and passes around a driven sprocket wheel 26, the sprockets of which enter the perforations of the film, so that the film is drawn from the supply reel at a uniform speed. The film passes from sprocket wheel 26 through gate 23 and thence to a second driven sprocket wheel 27 which feeds it at a constant rate to take-up reel, not shown. The take-up reel is driven by a friction drive, so that the film is not subjected to undue tension despite variation in the diameter of the roll of film on the take-up reel. The gate 23 includes a feed mechanism of the Maltese cross or claw types, which holds the film stationary within the gate while the shutter is opened, and then moves the film rapidly by one frame when the shutter is closed. Because of this intermittent motion of the film, it is necessary to form loops 28, 29 of the film between the gate and sprocket wheels.

In the form of the new apparatus shown in Fig. 2, the film 30 is led from the supply reel, not shown, around a freely rotating smooth guide roller 31 and thence to a reciprocating holder, generally designated 32, from which the film passes around a second freely rotating smooth guide roller 33 to a take-up reel (not shown), which is driven in the usual way. The holder comprises a flat plate 34 having laterally curved ends, which are attached to ends of flat leaf springs 35, 36, the other ends of the springs being anchored to fixed parts 37, 38 of the projector. The plate 34 is provided with flanges 39, 40 along its opposite edges, and the flanges overlie the edges of the film and engage it frictionally. The plate 34 is provided with a rectangular opening 41 for the passage of the beam of light through the film, and the opening has a width corresponding to that of a frame of the film and its height is at least twice the height of a frame. A fixed gate 42 having an opening 42a is mounted in front of the holder.

Opening 41 in plate 34 has a slot 41a extending downwardly therefrom at one corner, and the pointed end of a detent 43 projects into the slot. The detent engages in perforations in the film to prevent its backward movement and it is pressed by a spring 44 against a stop pin 45, the pin preventing the pointed end of the detent from projecting too far through the slot. The detent is rotatably mounted to encircle a disk 46 eccentrically attached to a shaft 47, rotation of the shaft adjusting the position of the pointed end of the detent in slot 41a.

During the operation of the apparatus, the holder is reciprocated through a distance equal to the height of a frame of the film and, for this purpose, the holder carries a cylindrical projection 48 engaging the rim of a cam disk 49 mounted on a driven shaft 50. One form of the cam disk is shown in Fig. 4, the disk rotating in the direction of the arrow. The disk has a pair of operating surfaces formed as Archimedean spirals, one of which extends in the direction of the arrow from radius D to radius F, while the other surface extends from radius F to radius D. The first operating surface of the cam shown is ⅞ of the circumference, while the second operating surface is ⅛ of the circumference. The first surface is thus seven times as long as the second. The curves of the operating surfaces are of such form that the maximum rise $a$ of the cam is equal to the height of a frame of the film and also to the stroke of the reciprocating holder. From an inspection of the cam, it will be evident that, during ⅞ of its revolution, the holder 32 will move upward at a slow uniform rate, and, during the last ⅛ of the revolution of the cam, the holder will move rapidly downward. The cam shown makes one revolution for each complete reciprocation of the holder, but, if desired, the cam may be formed with additional pairs of operating surfaces and can thus be driven at a slower speed.

In the modified form of cam shown in Fig. 5, the operating surface from radius D' to radius F' has the form of an Archimedean spiral, while the surface from radius F' to radius D' has been altered to protect the holder and film from damage that might result from acceleration, when the direction of movement of the holder is reversed. At the points where the radii D', F' intersect the operating surfaces, these surfaces are slightly rounded, so that the curve from F' to D' is of approximately sinusoidal form, which has proven to give the best results in practice.

The manner in which the operation of the apparatus described, causes the film to be drawn from the supply reel at a substantially uniform rate without driving guide rollers 31 and 33 and without forming the film into loops, may best be understood by a consideration of Fig. 6, which shows the upper part of plate 34 and a part of the leaf spring 35. In the view, the holder is assumed to be in its lowermost position and, in order to arrive at its extreme upper position, it must be moved through a stroke $a$, which is the distance C—B. It has been found permissible in practice to assume that guide roller 31 is located at an infinite distance and the lines A' and B', which indicate the direction of movement of the film strip from the guide roller to plate 34 in the upper and lower positions of the plate, are, accordingly, shown as parallel. The plane of the film strip as it approaches the holder makes an angle $\alpha$ with the normal to the direction of reciprocation of plate 34.

When the holder moves upwardly with the film held stationary by detent 43, a length of film will be drawn from the supply reel. The length of film so unreeled is equal to the length of the stroke $a$ of the holder less the distance $b$, which is that between the point C and the normal to line A' at the point B. When the holder moves downwardly, a length of film equal to $b$ will be unreeled. In the triangle ABC the angle ABC will be seen to be equal to angle $\alpha$.

In order to insure that the film will be unreeled at the same speed during both the upward and downward strokes of the holder, the angle $\alpha$ must be such that $s \sin \alpha = 1/n$. This value for the angle is arrived at as follows. Assuming that the feeding movement of the holder consumes $x$ units of time and that the total time of a reciprocation of the holder takes $nx$ units of time, then the return movement of the holder requires $(n-1)x$ units of time. In order that the speed, at which the film is unreeled in both the feeding and return movements of the holder may be uniform, it is necessary that $$\frac{a-b}{n-1}=\frac{b}{1}$$

which equation may be converted into $$\frac{b}{a}=\frac{1}{n}$$

From Fig. 6, it will be apparent that $$\frac{b}{a}=\sin \alpha$$

so that, when $$\sin \alpha \text{ equals } \frac{1}{n}$$

the condition for uniform unreeling of the film during the two strokes of the holder is fulfilled. When the apparatus is driven by one or the other of the cams Figs. 4 and 5, $n = 8$, in which event $$\sin \alpha = \frac{1}{8} = 0.125$$

so that $\alpha$ is approximately 7°

In the modified construction shown in Fig. 7, the film 30a passes from the upper guide roller 31a to a holder comprising leaf springs 16a, 17a connected by a link 51. The springs are anchored at one end and a flanged roller 52 is mounted for rotation on the free end of each spring. The flanges on the rollers 52 frictionally engage the edges of the film and have the same effect as flanges 39, 40 on plate 34. Link 51 is formed with a cam follower 53 engaging a cam 54 and, between rollers 52, the film travels through a passage formed by fixed members 55 formed with openings providing the gate. The opening in one of the members 55 has a slot, through which the end of a springpressed pawl 43a engages the film. From the lower flanged roller 52, the film passes around a freely rotating guide roller 33a. In the travel of the film to the upper guide roller 52 and from the lower guide roller 52, the plane of the film makes an angle $a$ with normals to the direction of reciprocation of the length of film between rollers 52.

In the modified construction shown in Fig. 8, the film 30b travels around an upper guide roller 31b and thence to a holder, generally designed 32b and comprising an arcuate plate 56 mounted on arms 57 extending radially from a hub 58 on a pivot 59. Near each end of plate 56 is mounted a smooth freely rotating roller 60, and the film passes beneath the rollers 60 and the length of film between them lies in contact with the curved surface of plate 56 make an angle $a$ with radii of plate 56, which pass through the points where the film first and last engages the curved surface of the plate.

In the modified constructions shown in Figs. 9 and 10, the film 30c is drawn from a supply reel 63 and travels over a smooth freely running guide roller 31c. The holder 32c has the form of a bell crank mounted for oscillation on a pin 64 and one leg of the bell crank is formed with a lateral extension 65 having a curved flange 66, with which the film engages as it leaves guide roller 31c. A plate 67 is mounted beneath projection 66 on a stud 68, which passes through an opening in extension 66, and a spring 69 encircling the stud bears at one end against a nut 70 on the end of the stud and, on the other, against extension 66. The film passes between extension 66 and plate 67 and the latter is formed to engage the edges of the film frictionally under the pressure of spring 69.

The pin 64 extends through a cylindrical sleeve 71 on holder 32c and into a stationary block 72, which has a bore in which an objective 73 is mounted. The block is of circular section with a portion cut away to permit free movement of extension 66 of the holder. Beyond the cutaway portion, the block has an arcuate surface over which the film travels. From the curved surface of the block, the film passes around a smooth guide roller 74 carried by another leg of the holder 32c. The holder is formed with a lateral extension 75 having a projection 76 bearing against the surface of a cam 77 on a shaft 78, and a spring 79 attached at one end to a part of the holder and, at the other, to a fixed part of the apparatus, keeps projection 76 in contact with the surface of the cam at all times. Shaft 78 carries the usual rotatable shutter 80 and is driven from a motor (not shown) by a pulley 81 and a spring belt 82.

In the operation of the apparatus shown in Fig. 9, the oscillation of holder 32c in a counterclockwise direction causes the film to be advanced and, as the holder moves backwardly, the film is prevented from moving with it by a spring-pressed pawl 83, the end of which enters a perforation in the film. The planes of the film as it approaches flange 66 on extension 65 of the holder and leaves roller 74 on the holder make angles $a$ with radii of the block 72, which pass through the points, where the film first engages flange 66 and last touches roller 74. These radii may be considered as normals to the direction of oscillation of the holder.

In the various forms of apparatus embodying the invention, the time required for the return stroke of the reciprocating film holder is $(n-1)$ times greater than the time required for the feed stroke. Accordingly, the surface of the cam, which is active during the return stroke, is $(n-1)$ times as long as the surface, which is active during the feed stroke. The value of $n$ ordinarily lies between 5 and 9.

I claim:

1. An apparatus for feeding film having perforations from a supply, which comprises a holder frictionally holding a length of the film and reciprocable in a direction generally lengthwise of said length of film to feed the film in the movement of the holder in one direction, means for reciprocating the holder with a feeding movement in $x$ units of time and a return movement in $(n-1)x$ units of time, said reciprocating means including a cam having a pair of operating surfaces, one of which is $(n-1)$ times as long as the other, a detent entering a perforation in said length of the film to prevent its return movement with the holder, and guides directing the film to and from the holder, said guides being so positioned that the planes of the film, as it approaches and leaves the holder, make approximately equal angles $a$ with normals to the direction of reciprocation of the holder, which pass through the points where the film first and last engages the holder, sin $a$ being approximately equal to $1/n$.

2. An apparatus for feeding film having perforations from a supply, which comprises a holder frictionally holding a length of the film and reciprocable in a direction generally lengthwise of said length of film to feed the film in the movement of the holder in one direction, means for reciprocating the holder with a feeding movement in $x$ units of time and a return movement in $(n-1)x$ units of time, said reciprocating means including a cam having a pair of operating surfaces, one surface having the form of a spiral and being $(n-1)$ times as long as the other, a detent entering a perforation in said length of the film to prevent its return movement with the holder, and guides directing the film to and from the holder, said guides being so positioned that the planes of the film, as it approaches and leaves the holder, make approximately equal angles $a$ with normals to the direction of reciprocation of the holder, which pass through the points where the film first and last engages the holder, sin $a$ being approximately equal to $1/n$.

3. An apparatus for feeding film having perforations from a supply, which comprises a holder engaging a length of film at opposite ends thereof and mounted for oscillation about a center to feed the film in the movement of the holder in one direction, means on the holder for frictionally engaging said length of film, means for oscillating the holder with a rapid feeding movement in $x$ units of time and a slow return movement in $(n-1)x$ units of time, a detent entering a perforation in said length of the film to prevent its return movement with the holder, means engaging said length of film between its ends and holding it in the arc of a circle about said center, and guides directing the film to and from the holder, said guides being so positioned that the planes of the film, as it approaches and leaves the holder, make approximately equal acute angles with radii from said center, which pass through the points where the film first and last engages the holder, the sine of the angle being equal approximately to $1/n$.

4. An apparatus for feeding film from a supply past a gate, which comprises a block having a passage extending through it and aligned with the gate, the surface of the block on either side of the end of the passage adjacent the gate being of circular arcuate form and the block having a recess at one end of the surface, a holder pivoted to rock about the center of the arc of said surface and having a radial arm with an end entering the recess in the block, means on said end of the arm for frictionally engaging the film to be fed, a second radial arm on the holder carrying a roller overlying the surface of the block beyond the gate, the film being led from said frictional means in contact with the surface of the block and over said roller, means for rocking the holder with a fast feeding movement and a slow return movement, means engaging the film to hold it against return movement with the holder, and a pair of rotary guides directing the film to said frictional means and from said roller in such manner that the planes of the film, as it approaches said frictional means and leaves said roller, make equal small acute angles with radii from said center passing through the points where the film first engages said frictional means and last engages said roller.

5. An apparatus for feeding film having perforations from a supply past a gate, which comprises a block having a passage extending through it and aligned with the gate, the surface of the block on either side of the end of the passage adjacent the gate being of circular arcuate form and the block having a recess at one end of the surface, a holder pivoted to rock about the center of the arc of said surface and having a radial arm with an end entering the recess in the block, means on said end of the arm for frictionally engaging the film to feed the film in the rocking movement of the holder in one direction, means for rocking the holder with a rapid feeding movement and a slow return movement, a detent entering a perforation on the film to hold it against return movement with the holder, a second radial arm on the holder carrying a roller overlying and spaced from the surface of the block beyond the gate, the film being led from said frictional means in contact with the curved surface of the block and over said roller, and a pair of free running rotary guides directing the film to said frictional means and from said roller.

6. An apparatus for advancing film from a supply past a gate, which comprises a block having a passage extending through it in alignment with the gate, the block having a smooth surface on both sides of the end of the passage adjacent the gate and a recess at one end of said surface, a holder pivoted for rocking movement and having a radial arm with an end entering the recess in the block, means on said end of the arm for frictionally engaging the film to be fed, a second radial arm on the holder carrying a roller lying adjacent said surface of the block beyond the gate, the film passing from said frictional means in contact with said surface on the block and over said roller, means for rocking the holder with a fast feeding movement and a slow return movement, means engaging the film to hold it against return movement with the holder, and a pair of free-running rotary guides directing the film to said frictional means and from said roller.

7. An apparatus for advancing film from a supply past a gate, which comprises a block having a passage extending through it in alignment with the gate and a smooth surface on both sides of the end of the passage adjacent the gate, at least a part of said surface being curved and the block having a recess at one end of said surface, a holder pivoted for rocking movement and having a radial arm with an end entering the recess in the block, means on said end of the arm for frictionally engaging the film to be fed, a second arm on the holder carrying a roller lying adjacent said surface of the block beyond the gate, the film passing from said frictional means in contact with said surface on the block and over said roller, means for rocking the holder with a fast feeding movement and a slow return movement, means engaging the film to hold it against return movement with the holder, and a pair of free-running rotary guides directing the film to said frictional means and from said roller.

KARL GUSTAV ZEUTHEN.

REFERENCES CITED

The following references are of record in the file of this patent:

UNITED STATES PATENTS

| Number | Name | Date |
| --- | --- | --- |
| 1,037,112 | Bingham | Aug. 27, 1912 |
| 1,309,471 | Evans | July 8, 1919 |
| 2,122,946 | Lira | July 5, 1938 |
| 2,448,519 | Clapp | Sept. 7, 1940 |

FOREIGN PATENTS

| Number | Country | Date |
| --- | --- | --- |
| 103,511 | Great Britain | Jan. 26, 1917 |